United States Patent [19]

Hinotani et al.

[11] Patent Number: 4,654,559
[45] Date of Patent: Mar. 31, 1987

[54] FLAT COLOR CATHODE-RAY TUBE

[75] Inventors: Katsuhiro Hinotani, Shijyonawate; Hajime Hayama, Nara; Shunichi Kishimoto, Kaizuka; Takashi Miwa, Higashiosaka; Yasuo Funazo, Toyonaka; Kazuhiro Kouno, Hirakata, all of Japan

[73] Assignee: Sanyo Electric Co., Ltd., Osaka, Japan

[21] Appl. No.: 776,270

[22] Filed: Sep. 16, 1985

[30] Foreign Application Priority Data

Sep. 18, 1984 [JP] Japan ................. 59-195305

[51] Int. Cl.⁴ .............. H01J 29/32; H01J 29/34; H01J 29/86
[52] U.S. Cl. ..................... 313/422; 313/466; 313/471
[58] Field of Search .......... 313/471, 466, 422

[56] References Cited

U.S. PATENT DOCUMENTS

| 3,005,125 | 10/1961 | Evans et al. ................. 313/471 |
| 3,154,715 | 10/1964 | Jackson et al. ............. 313/471 X |
| 4,180,760 | 1/1978 | Chang ....................... 313/422 |
| 4,551,652 | 11/1985 | Compen et al. ............. 313/446 |

FOREIGN PATENT DOCUMENTS

| 84-03796 | 3/1984 | Japan . |
| 0087741 | 5/1984 | Japan ................. 313/422 |

Primary Examiner—Palmer C. DeMeo
Attorney, Agent, or Firm—Armstrong, Nikaido, Marmelstein & Kubovcik

[57] ABSTRACT

A flat color CRT wherein a single beam emitted from an electron gun scans the inner surface of a tube wall and which includes a phosphor screen formed on the walls inner surface. The phosphor screen comprises a nonluminescent substance and phosphor index stripes with the substance interposed between the stripes. Red, green, blue primary phosphor color stripes have a sufficient thickness and are arranged repeatedly on the nonluminescent substance at a spacing in a definite relation to the phosphor index stripes.

8 Claims, 12 Drawing Figures

FLAT COLOR CATHODE-RAY TUBE

TECHNICAL FIELD

The present invention relates to a flat, color cathode-ray tube (hereinafter referred to as "CRT") having a beam-indexing system incorporated therein.

PRIOR ART

As is well known, beam-indexing color CRTs have a phosphor screen comprising a multiplicity of phospher index stripes arranged on the inner surface of a panel. In addition, three primary phosphor color stripes are repeatedly arranged on the inner surface panel of the in a definite relation to the phosphor index stripes. When the phosphor screen is scanned by a single electron beam, an index light signal is obtained. The screen is utilized by the electron beam to excite the desired phosphor color with a specified amount of the electron beam for the reproduction of color images.

There are two types of flat, color CRTs incorporating such a beam-indexing system. FIG. 9 shows the structure of one of these types. With reference to FIG. 9, a flat glass tube 1 comprises a neck 3 accommodating an electron gun 2, a funnel 4 and a panel 6 provided with a phosphor screen 5 on an inner surface. The phosphor screen 5 is inclined with respect to the central axis of the electron gun 2 (to the direction of propagation of an electron beam 7 when the beam is not deflected).

The phosphor screen 5 comprises red, green, blue, i.e., three primary phosphor color stripes 8 repeatedly arranged on the inner surface of the panel 6. A metallic layer 9 of aluminum is formed over the resulting inner surface of the panel. Phosphor index stripes 10 are provided on the metallic layer 9 in a definite relation to the primary phosphor color stripes 8 (FIG. 10).

In the aforementioned flat, color CRT, a single electron beam 7 is emitted by the electron gun 2. The beam is deflected by a deflection yoke 14 and scans the phosphor screen 5 to produce index light. The index light strikes a light collector plate 11 disposed on the rear side of the funnel 4. The index light collected by the plate 11 is converted to a wavelength matching the sensitivity of a photodetector, from which the light is led to a photodiode 12 provided at one end of the light collector plate 11. The photodiode 12 produces an electric signal upon conversion. Published Unexamined Japanese Patent Application No. SHO 57-65651 discloses a light collector plate which is usable as the plate 11.

On the other hand, the electron beam 7 passes through the metallic layer 9 and excites a color phosphor stripe 8, whereupon the stripe luminesces. The luminescence can be observed through the panel 6.

However, a drawback of the flat, color CRT of the above construction is that an insufficient luminance color image is reproduced because the electron beam 7 excites the color phosphor stripe 8 through the metallic layer 9. Insufficient luminance is due to the phosphor screen 5 being arranged inclined to the axis of the electron gun 2. Therefore, the beam 7 is incident on the screen 5 obliquely, resulting in the electron beam traveling a longer distance as it passes through the metallic layer 9. An increased proportion of the electron beam energy therefore attenuates within the metallic layer 9 to further reduce the luminance of luminescence of the phosphor color stripe 8.

Published Unexamined Japanese Patent Application No SHO. 57-27541 discloses a flat, color CRT of another type which is adapted to overcome the above drawback. FIGS. 11 and 12 schematically show the construction of the CRT. With reference to FIG. 11, a phosphor screen 5' comprises phosphor index stripes 10 provided on the inner surface of a panel 6. A metallic layer 9 of uniform thickness is formed over the panel's inner surface to cover the stripes 10. Primary phosphor color triplet stripes 8 are provided on the metallic layer 9. In this case also, the phosphor index stripes 10 are of course arranged in a definite relation to the arrangement of phosphor color stripes 8.

With the above described flat, color CRT, an electron beam 7 directly excites the color phosphor stripe 8 for luminescence. The luminescence is reflected from the metallic layer 9 toward the interior vacuum space of the flat glass tube 1, so that a bright color image can be observed through a window formed in a funnel 4.

Nevertheless, the phosphor screen 5' has a drawback. FIG. 12 shows the screen 5' in greater detail. The electron beam 7 passes through the metallic layer 9 and excites the phosphor index stripe 10, which therefore produces weak luminescence. Consequently, the index light incident of a light collector plate 11 through a panel 6 is low in intensity.

Beam-indexing color TV receivers require an index signal be obtained at all times in order to detect the position of the electron beam, so that even when a black image is reproduced, a beam current not lower than a specified level is passed. Accordingly, a smaller amount of electron beam is needed for producing the index signal for the black level in order to improve the contrast to the image. However, because the metallic layer attenuates the energy of the electron beam as mentioned above, a larger amount of electron beam is required to reproduce the black level even with a CRT of the second type than when the electron beam directly excites the phosphor index stripes. This invariably results in a lower contrast.

To assure improved contrast, a nonluminescent carbon layer is formed in the spaces 5a' the phosphor color stripes other than those spaces where the phosphor index stripes are provided. However, since the aluminum forming the metallic layer is generally porous, it is extremely difficult to form the carbon layer over the metallic layer. The nonluminescent substance commercially available generally comprises a mixture of carbon and an aqueous solution of ammonia or alkali material to render the carbon effectively separable. However, the solvent is not compatible with the metallic layer of aluminum.

SUMMARY OF THE INVENTION

An object of the present invention is to provide a beam-indexing flat CRT for reproducing bright images with an improved contrast ratio.

Another object of the invention is to provide a color CRT which has no metallic layer and in which the electron beam directly excites phosphor index stripes.

Still another object of the present invention is to provide a phosphor screen for CRTs wherein the position of a mask pattern and position-matching marks relative to each other is easily adjustable.

More specifically, the present invention provides a CRT having a phosphor screen comprising phosphor index stripes and a black nonluminescent substance both of which are provided on the inner surface of a panel.

The stripes are interposed between portions of the substance. Primary phosphor color triplet stripes are arranged at a predetermined spacing on the nonluminescent substance layer and have a sufficient thickness. The phosphor index stripes are provided in some of the spaces between the phosphor color stripes in a definite relation thereto.

DETAILED DESCRIPTION OF THE INVENTION

Figure 1:
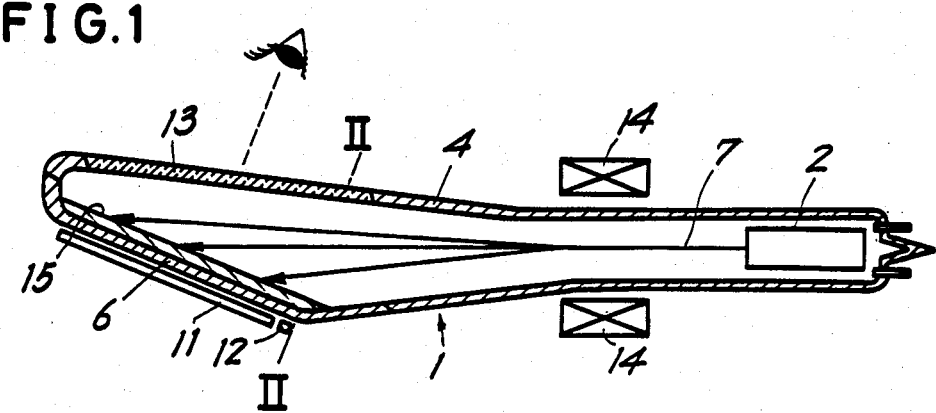
FIG. 1 is a longitudinal sectional view showing a flat, color CRT according to the present invention.
Figure 11:
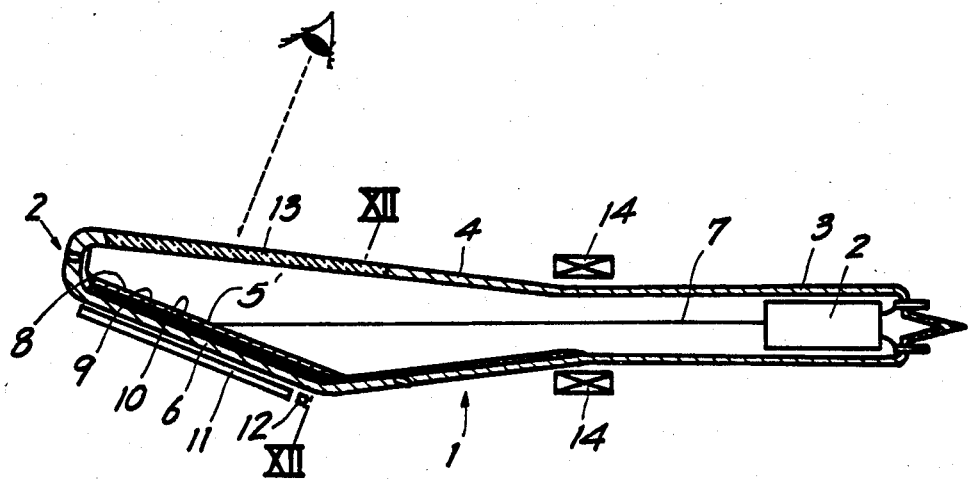
FIG. 11 is a longitudinal sectional view showing another conventional flat, color CRT.
Figure 12:
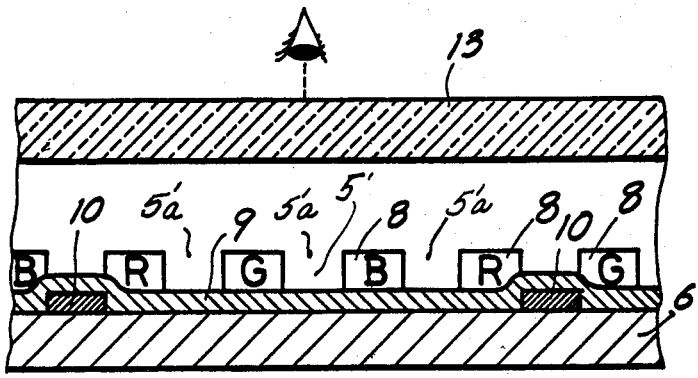
FIG. 12 is a sectional view taken along the line XII—XII in FIG. 1.

FIG. 1 schematically shows a flat, color CRT of the present invention. The CRT is similar to the construction shown in FIG. 11 of a flat glass tube 1, an electron gun 2, deflection yoke 14 and light collector plate 11. The CRT has a phosphor screen 15 which is characteristic of the invention and which therefore will be described below with reference to FIGS. 2 and 3 which are sectional view taken along the line II—II in FIG. 1.

Figure 2:
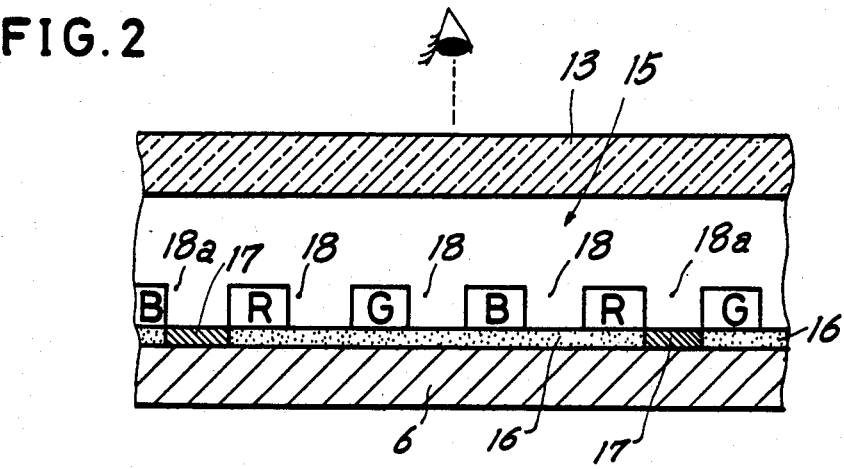
FIG. 2 is a view in cross section taken along the line II—II in FIG. 1 and showing an embodiment of the present invention.

FIG. 2 shows a first embodiment. A layer 16 of carbon or like black nonluminescent substance is formed in the shape of stripes on the inner surface of a panel 6. Also formed on the panel's inner surface are index stripes 17 of a phosphor such as P47 phosphor (brand name of $Y_2SiO_5.Ce$, product of KASEI OPTONICS K.K.). The layer 16 is interposed between the index strips 17. Primary phosphor color triplet stripes R (red), G (green) and B (blue) are arranged at a specified spacing on the nonluminescent substance layer 16 in a definite relation to the phosphor index stripes 17. The phosphor index stripes 17 are disposed in some (18a) of the spaces 18 between the phosphor color stripes. The phosphor color stripes have a thickness sufficient for these stripes to reach saturation luminance when luminescing to the highest luminance.

With the arrangement described above, an electron beam directly excites the phosphor color stripes R, G, B and the phosphor index stripes 17, enabling the viewer to observe bright images through an observation window 13 and giving index light of high intensity through the panel 6. Moreover, images of improved contrast ratio can be obtained because the black nonluminescent substance layer 16 is present in the spaces 18 between the phosphor color stripes other than the spaces 18a where the phosphor index stripes 17 are positioned.

Furthermore, the nonluminescent substance layer 16, on which the phosphor color stripes R, G, B are arranged blocks the luminescence of the color phosphors that otherwise would strike the light collector plate 11 through the panel 6. Therefore, only the luminescence of the phosphor index stripes 17 is emitted toward the collector plate. Thus, the index light alone can be separated effectively. Another advantage of the phosphor screen 15 is that it is easy to fabricate because there is no need to form a metallic layer and further because the nonluminescent layer 16 has a large stripe width.

The phosphor color stripes R, G, B have a sufficient thickness, so that the deficit of luminance due to the absence of a metallic layer can be fully compensated. Our experiments have shown that satisfactory luminance is available for a beam current of 30 $\mu A$ and anode voltage of 6 kV when the color stripes, R, G, B are at least 20 $\mu m$ in thickness.

Figure 3:
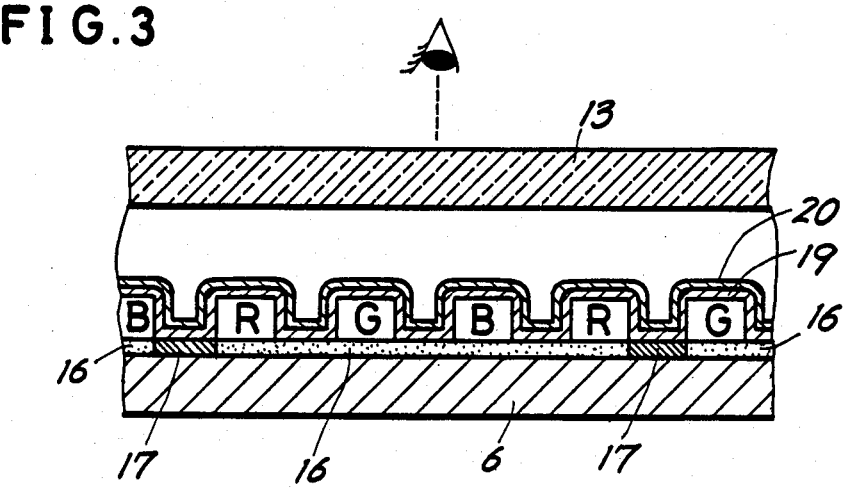
FIG. 3 is a view showing another embodiment.

FIG. 3 shows a second embodiment. Throughout FIGS. 2 and 3, like parts are referred to by like numerals.

According to the second embodiment, the phosphor screen 15 of the first embodiment is entirely covered with a protective transparent thin film 19 of silicon dioxide ($SiO_2$), which is further entirely covered with a very thin electrically conductive transparent film 20, such as a thin film of ITO (indium oxide doped with tin oxide), formed by vacuum evaporation.

The CRT, although a vacuum in its interior, still contains remaining undesirable substances in the form of a gas. Thus, anions will be produced upon ionization when electrons collide with such substances. Accordingly, in the first embodiment such anions can strike the phosphor to break and scorch the phosphor. With the second embodiment, however, the phosphors are covered with the protective transparent thin film 19 of $SiO_2$. Thus, the film prevents the anions from stinking and scorching the phosphor. The film also prevents the phosphor stripes from peeling off.

When the $SiO_2$ film 19 is provided, negative charges can accumulate in the film 19. The film is an insulator. Thus, the luminescence efficiency of the phosphors is reduced. According to the present embodiment, however, a high voltage, approximately at the same level as the positive voltage applied to the conductive nonluminescent layer 16, is applied to the conductive transparent film 20. This eliminates the reduction of luminescence efficiency due to the accomplished negative charge the film.

The protective film 19 is several hundred angstroms in thickness, while the conductive film 20 has a thickness of 200 to 300 angstroms. The very small thickness of these films will not substantially attenuate the electron beam.

Figure 4:
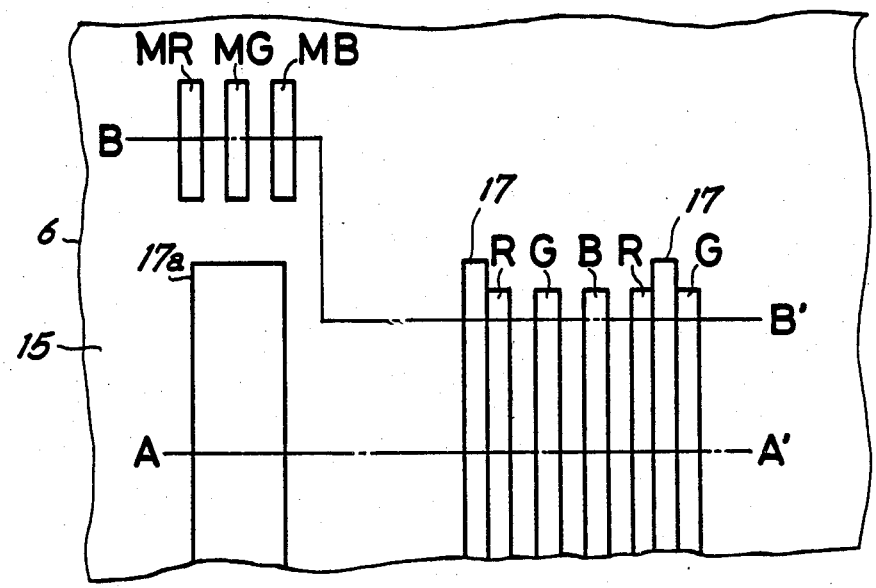
FIG. 4 to FIG. 6 are diagrams illustrating a process for forming the phosphor screen of the color CRT of the invention.
Figure 5:
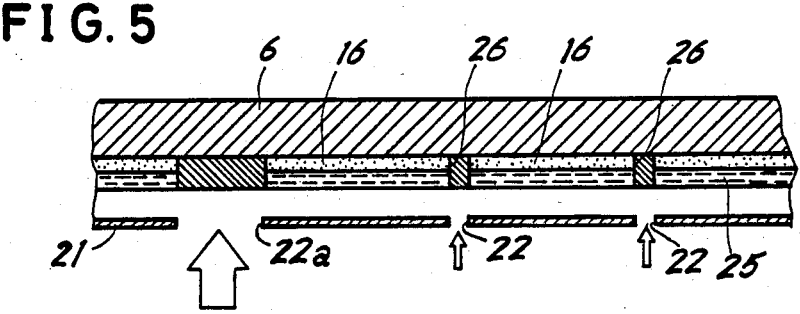
Figure 6:
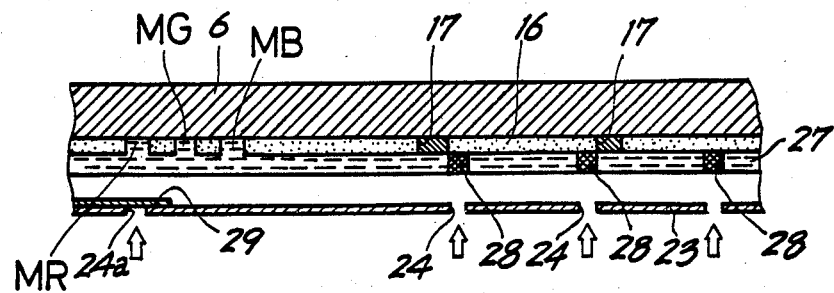

Referring to FIGS. 4 to 8, processes for preparing the phosphor screen of the above embodiments will be described. FIG. 4 shows the phosphor screen 15 as viewed through the observation window 13 of the glass tube 1. FIG. 5 is a sectional view taken along the line A—A' in FIG. 4. FIG. 5 shows an exposure procedure for forming the phosphor index stripes. FIG. 6 is a sectional view taken along the line B—B' in FIG. 4 and shows an exposure procedure for forming the phosphor color stripes.

The mask patterns to be used is formed with apertures in conformity with the phosphor index stripes 17, position matching marks MR, MG, MB, phosphor color stripes R, G, B or run-in phosphor index stripe 17a. The light from an exposure light source passes through the apertures as seen in FIGS. 5 and 6 and impinges on a photosensitive coating.

First, a glass panel is prepared. The panel is coated with a carbon coating composition everywhere except where the index stripes, position matching marks and run-in index stripe are to be formed.

A photoresist is uniformly applied to the glass panel 6 and then dried. Next, the coating is exposed to light through a mask pattern only where the index stripes, position matching marks (the function of which will be described later) and run-in index stripe are to be formed. The photoresist is then cured. When the panel is then washed with water, only the exposed cured resist portions remain on the panel's inner surface.

Subsequently, a carbon (nonluminescent substance) coating composition is uniformly applied to the entire panel inner surface. The panel is dried and thereafter immersed in an oxidizing solution. Thus, the cured resist film is swollen and removed from the panel surface. Consequently, the panel is formed with a carbon coating over the entire surface except where the index stripes, matching marks and run-in index stripe are to be provided.

Next, with reference to FIG. 5, a slurry 25 of phosphor index and photoresist is uniformly applied to the panel's inner surface and then dried. Subsequently, an index stripe forming mask pattern 21 is placed over the panel surface in register with the portions bearing no carbon. The slurry coating is exposed to light through apertures 22 and 22a to cure the photoresist as indicated at 26. The uncured coating is then removed by washing it with water, with the result that the cured portions 26 provide the phosphor index stripes 17 and a run-in index phosphor stripe 17a corresponding to the aperture 22a.

The primary phosphor color stripes R, G, B are formed on the carbon layer in a definite relation to the index stripes 17 thus formed, by the following method.

Because the phosphor color stripes are to be formed on the carbon layer as shown in FIG. 6, the light of the exposure light source through the apertures 24 of a phosphor color stripe forming mask pattern 23 is not observable through the carbon layer and the panel 6. Thus, it is impossible to set the mask pattern 23 in position.

According to the present invention, however, the position matching marks MR, MG, MB are provided in a corresponding relation to the positions of the color stripes, so that each mask pattern 23 can be set in position. More specifically, the three position matching marks MR, MG, MB formed outside the effective image area are in a corresponding relation to the positions where the phosphor color stripes R, G, B are to be formed. For example, when the red phosphor color stripes are to be formed, the mask pattern 23 is so positioned that the light through its matching aperture 24a can be seen through the center of the red mark MR as shown in FIG. 6. Subsequently, a phosphor slurry 27 for red is formed over the carbon layer 16 and is exposed to light through the pattern 23 and then washed with water. Consequently, the exposed cured portions 28 only remain on the carbon layer as the red phosphor color stripes.

Similarly the green and blue phosphor stripes are formed, with each mask pattern 23 so positioned that the light through the aperture 24a can be seen at the center of the green mark MG or the blue mark MB.

To shield the phosphors in the position matching marks MR, MG, MB from the exposure light and to thereby prevent the phosphors from remaining in the marks, the matching aperture 24a of each mask pattern 23 is usually provided with a film 29 for blocking ultraviolet rays. If otherwise, the electron beam, when overscanning, would excite the phosphor remaining in the mark, and the resulting luminescence would disturb the color image. The film 29 avoids such an objection.

Nevertheless, the ultraviolet blocking film 29, if provided, reduces the amount of light through the aperture 24a, presenting some difficulty in positioning the mask pattern with reference to the mark.

The desired phosphor screen can be fabricated in the following manner without using the blocking film 29.

Figure 7:
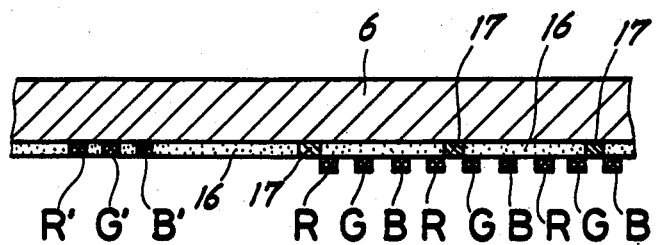
FIGS. 7 and 8 are diagrams illustrating another process for forming the phosphor screen of the color CRT.
Figure 8:
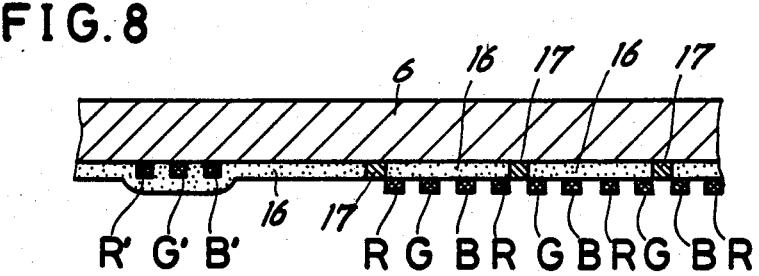
Figure 9:
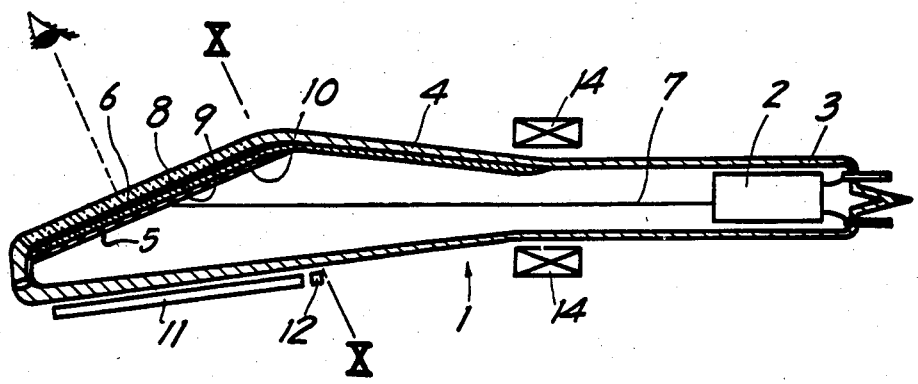
FIG. 9 is a longitudinal sectional view showing a conventional color flat CRT.
Figure 10:
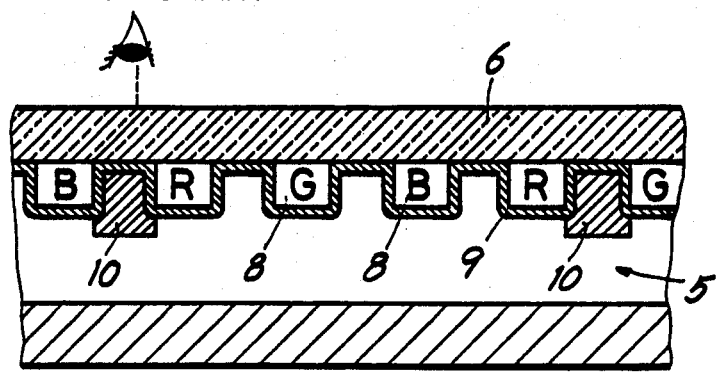
FIG. 10 is a sectional view taken along the line X—X in FIG. 9.

When the phosphor color triplet stripes are formed without using the blocking films 29, the phosphors R', G', B' are provided also in the matching marks MR, MG, MB as seen in FIG. 7. The phosphor portions R', G', B' thus formed are then completely covered with the nonluminescent substance 16 as shown in FIG. 8 to prevent luminescence of these phosphor portions.

The position matching marks MR, MG, MB, which are provided at one portion, may alternatively be formed at the four corners of the panel outside the effective image area.

The panel thus formed with the phosphor color stripes can be coated with $SiO_2$ first and then with ITO by vacuum evaporation after baking the stripes to obtain the screen shown in FIG. 3.

Although one phosphor index stripe is provided for every four phosphor color stripes according to the embodiments described, this arrangement is not limitative but is variable unless the index stripe is provided in every space between the color stripes.

The foregoing disclosure and description of the invention are illustrative and explanatory thereof, and various changes in the size, shape and materials, as well as in the details of the illustrated construction may be made without departing from the spirit of the invention.

We claim:

1. A flat, color CRT which comprises:
   a flat glass tube having first and second walls opposed to and spaced from each other, an electron gun for scanning the inner surface of said first wall with a single beam, and a phosphor screen provided on said inner surface of said first wall, said phosphor screen includes a nonluminescent substance and phosphor index stripes provided on said inner surface of said first wall with said nonluminescent substance interposed therebetween, and red, green, blue primary phosphor color stripes have a sufficient thickness and arranged repeatedly on said nonluminescent substance at a small distance from one another in a definite relation to said index stripes, said second wall being provided with an observation window for observing the luminescence of said phosphor color stripes of said phosphor screen.

2. A CRT as defined in claim 1 wherein said phosphor color stripes are at least about 20 μm in thickness.

3. A CRT as defined in claim 1 wherein said phosphor screen is entirely covered with a protective transparent thin film, and said protective film is further covered with an electrically conductive transparent film.

4. A CRT as defined in claim 3 wherein said protective film is made of $SiO_2$ and has a thickness of about several hundred angstroms.

5. A CRT as defined in claim 3 wherein said conductive film is made of ITO (indium tin oxide) and has a thickness of 200 to 300 angstroms.

6. A CRT as defined in claim 1 wherein said nonluminescent substance is black carbon.

7. A CRT as defined in claim 1 wherein three void portions are formed in the layer of said nonluminescent substance at least at one of the four corner portions of said phosphor screen outside its effective image area to provide position matching marks for said phosphor color stripes.

8. A CRT as defined in claim 7 wherein a phosphor is provided in each of said matching marks and cured with the light from an exposure light source through an aperture in a mask pattern, and said cured phosphor is completely covered with said nonluminescent substance.

* * * * *